May 27, 1969
O. G. GARNER
3,446,883
METHOD AND APPARATUS FOR PRODUCING CONDUCTORS
SURROUNDED BY THREE OR MORE EXTRUDED LAYERS
Filed Dec. 20, 1965
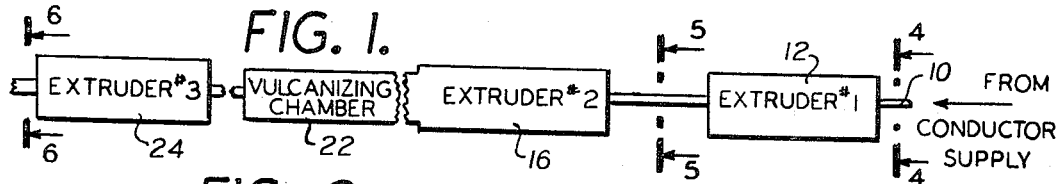
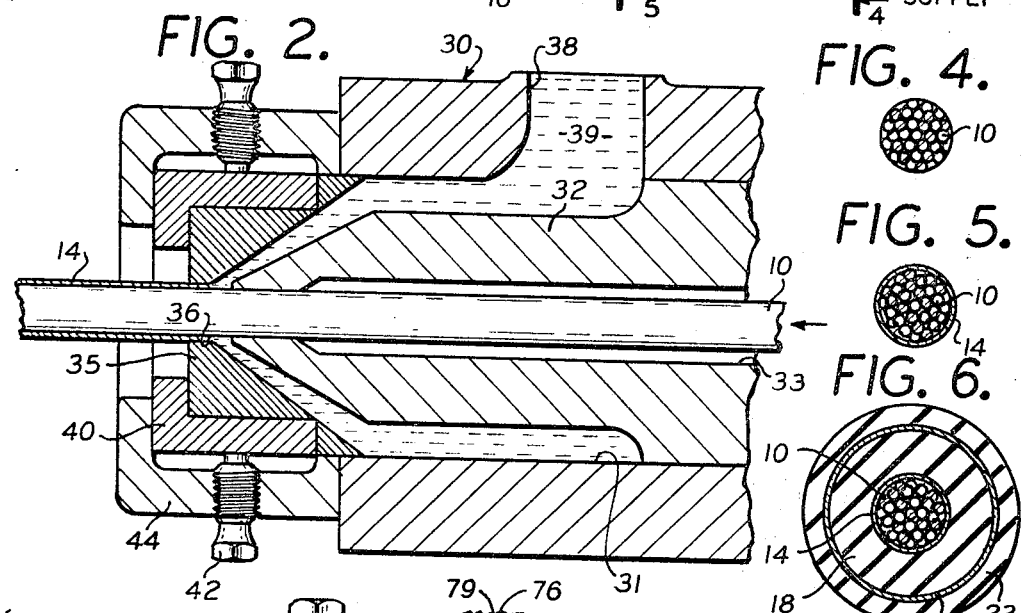
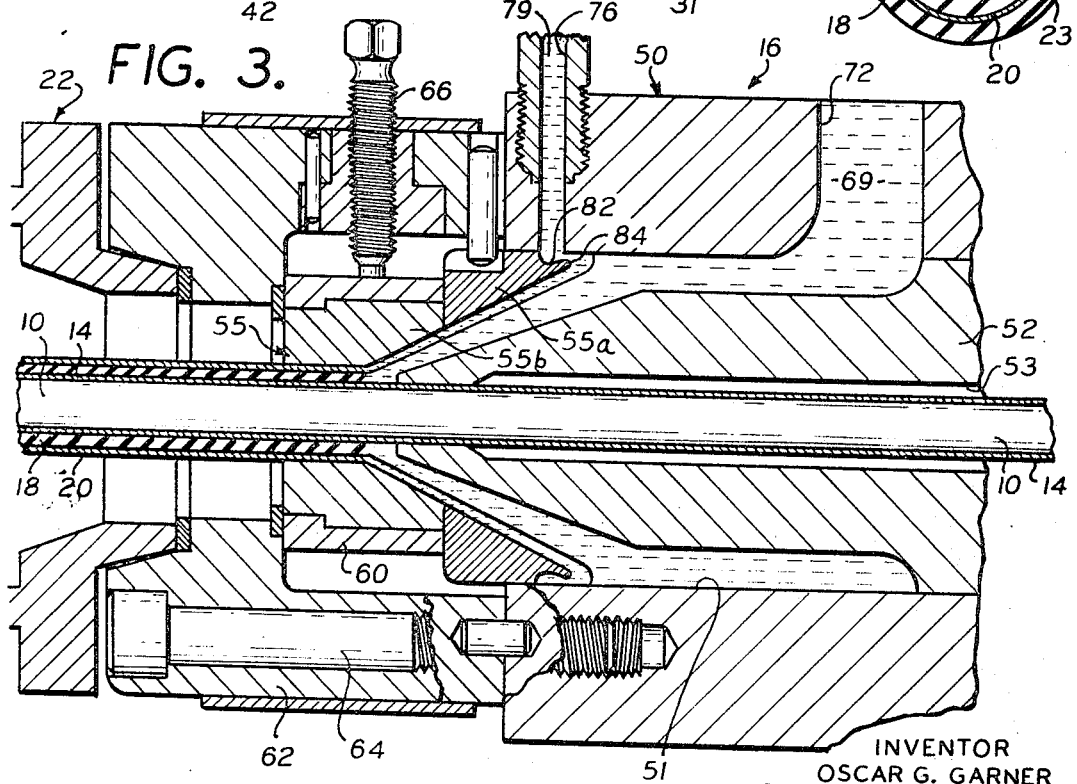
INVENTOR
OSCAR G. GARNER
BY
Sandoe, Neill, Schottler & Wikstrom
ATTORNEYS.

United States Patent Office 3,446,883
Patented May 27, 1969

---

3,446,883
METHOD AND APPARATUS FOR PRODUCING CONDUCTORS SURROUNDED BY THREE OR MORE EXTRUDED LAYERS
Oscar G. Garner, Westfield, N.J., assignor to General Cable Corporation, New York, N.Y., a corporation of New Jersey
Filed Dec. 20, 1965, Ser. No. 514,933
The portion of the term of the patent subsequent to Jan. 1, 1983, has been disclaimed
Int. Cl. B29f 3/10; B29h 9/08
U.S. Cl. 264—174          8 Claims

ABSTRACT OF THE DISCLOSURE

This specification discloses a method and apparatus for applying three layers of plastic insulation to an electrical conductor in less time and within less distance than would otherwise be required. A single inner layer of semi-conducting plastic is extruded in a thin coating which cools rapidly to a safe die-contacting temperature because of high conductivity of semi-conducting plastics and the contact with the bare metal conductor as a heat sink. Both of the other layers are then extruded simultaneously, including an insulating layer having a thickness which is several times greater than that of the inner semi-conducting layer. These two outer layers cannot cool rapidly because of the thickness but since no additional plastic is to be applied over them, the conductor with its three layers can pass directly into a vulcanizing chamber from the second extruder.

BRIEF DESCRIPTION AND BACKGROUND OF THE INVENTION

This invention relates to the extrusion of conducting and insulating layers onto an electrical conductor. The invention is an improvement on the method and apparatus disclosed in my co-pending application Ser. No. 198,153, filed May 28, 1962 now Patent 3,229,012 dated Jan. 11, 1966, and is applicable to electrical conductors on which a conducting layer is applied over the conductor and under insulation which is itself covered with a thin outer layer that may also be a conducting layer, all of the layers being applied in one continuous process.

It is an object of this invention to extrude three layers on an electrical conductor in one continuous process followed by vulcanization while all of the layers are freshly extruded and in condition to obtain the most effective bonding during vulcanization.

Another object is to extrude a thin inner layer directly onto the electrical conductor, taking advantage of the mass and the good heat conductivity of the conductor as a heat sink so that the inner layer cools rapidly to a temperature that will permit passage through a subsequent extruder promptly for the simultaneous application of other layers over the inner layer.

The invention not only obtains better bonding of the layers, but also greater freedom from voids and a high production rate. It is another object to provide both an improved method and apparatus for applying layers onto an electrical conductor of the character indicated.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views;

FIGURE 1 is a diagrammatic view showing the relation of the extruders and vulcanizing chamber for applying layers to a conductor in accordance with this invention;

FIGURE 2 is a greatly enlarged, fragmentary, sectional view of a portion of the first extruder shown in FIGURE 1;

FIGURE 3 is a greatly enlarged, fragmentary, sectional view of a portion of the second extruder shown in FIGURE 1; and FIGURES 4–6 are greatly enlarged sectional views taken on the section lines 4—4, 5—5, and 6—6, respectively, of FIGURE 1.

DESCRIPTION OF THE PREFERRED EMBODIMENT

A bare electrical conductor 10, shown in FIGURE 4 as a stranded conductor, is supplied continuously from a conductor supply, such as a spool, to a first extruder 12 in which an inner layer 14 (FIGURE 5) is applied onto the conductor 10. The construction and operation of this extruder 12 will be explained in connection with FIGURE 2.

From the extruder 12, the conductor 10 travels continuously to a second extruder 16, the construction and operation of which will be described in connection with FIGURE 3. Two additional layers 18 and 20 (FIGURE 6) are applied over the inner layer 14 in the extruder 16.

Beyond the extruder 16, the conductor 10 with its superimposed layers 14, 18 and 20 passes continuously passes continuously through a vulcanizing chamber 22 where the layers are heated to a temperature that causes vulcanization. Chamber 22 is preferably a catenary chamber through which the conductor passes without touching any guides or other surfaces while the outer layer 20 is soft and easily damaged. The vulcanizing chamber 22 is of conventional construction and its operation is well understood. If a protecting layer 23 is to be extruded over the layer 20, the conductor is passed through a third extruder 24 located far enough from the chamber 22 to permit the necessary cooling of the layers 18 and 20 before passage through the die in the extruder 24.

FIGURE 2 shows the construction of the first extruder 12. An extrusion tip 32 is supported in a conventional extruding machine die body chamber 31. The extrusion tip 32 is provided with a longitudinal aperture 33 through which the conductor 10 moves, from right to left as shown in FIGURE 2. Supported in the die body chamber 31, and spaced beyond the extrusion tip 32, is an extrusion die 35, having a throat 36 which determines the final overall diameter of the extruded layer which is applied to the conductor 10. The entry of plastic material for forming the layer which is extruded over the conductor 10 is made through an opening 38 in the extruding head 30. The plastic material, designated by the reference character 39, is conveniently forced into the extruding head opening 38 and through the extruder by the usual screw feeding means, not shown but well understood. Passage of the plastic material 39 through the relatively constricted passageway between the nozzle end of the extrusion tip 32 and the throat 36 of the die 35 forces the material 39 to form a compact wall or layer around the conductor 10.

The plastic 39 may be cross-linkable polyethylene or vulcanizable butyl rubber or vulcanizable ethylene-propylene polymers. The plastic is loaded with conducting carbon black so as to make the layer 14, which is applied to the conductor 10 by the extruding head 30, a conducting layer.

The thickness of the layer 14 depends upon the diameter of the throat 36 with respect to the diameter of the conductor 10. The extrusion die 35 is held in place by a retainer 40 and screws 42 which thread through an end portion 44 of the extruding head 30 at angularly spaced regions around the end portion 44. Different size extrusion dies 35 can be inserted into the extrusion head in order to obtain an inner layer 14 of different thickness.

The desired thickness of the inner layer 14 depends upon the diameter of the conductor 10 and the service for which the conductor is intended. A thinner wall thickness for the layer 14 is satisfactory for communication cable than for power cables. In any event, the minimum thickness of the layer 14 depends upon the physical characteristics of the material 39 which is extruded through the die 35 to form the layer 14. A thickness of about 15 to 20 mils is preferred. The plastic is extruded by the extruder 12, and by the other extruders 16, 21 and 24 at a temperature of about 400–425° F.

FIGURE 3 shows the construction of the extrusion die of the extruder 16. This extrusion die can be placed close to the extruder 12 because the layer 14 cools rapidly as it comes from the extrusion die 35. Being of thin wall and therefore small mass, and being in contact with the comparatively large mass of the conductor 10, which has very good heat conductivity, the layer 14 is cooled rapidly with the conductor acting as a heat sink as previously explained.

In FIGURE 3, an extrusion head 50 has a die body chamber 51 which supports an extrusion tip 52. This extrusion tip 52 has a longitudinal aperture 53 through which the conductor 10, coated with the inner layer 14, passes from right to left in FIGURE 3. Supported in the die body chamber 51, and spaced beyond the extrusion tip 52, is an extrusion die 55 which is shown constructed of two parts 55a and 55b. The die 55 has a throat 56 which determines the overall diameter of the layers which are extruded over the conductor in the extruder 16.

The die 55 is held in place by the combined action of the die body chamber 51, a retainer 60 and an end housing 62 which is secured to the extruder head 50 by screws 64 located at angularly spaced regions around the circumference of the end housing 62. The retainer 60 is centered in the end housing 62 by other screws 66 located at angularly spaced regions around the end housing 62 and at locations between the screws 64.

Plastic insulating material 69 is introduced into the extruding head 50 through a passage 72; the plastic 69 being forced in by a screw conveyor or other conventional means for supplying plastic under pressure to an extruding die. This material 69 may be the same as the material 39, previously described, but without the carbon black since the material 69 is for the purpose of forming an electrical insulating layer over the inner layer 14 which is a conductor layer. There is another passage 76 through which other plastic material 79 is introduced into the extruding head 50. This plastic material 79 is for the purpose of forming an insulation shielding layer over the layer formed by the insulating plastic 69; that is, the outer layer 20, and this outer layer 20 is preferably also a conducting layer, and may be made of the same material as the inner layer 10.

The plastic conducting material 79 which is to form the outer layer 20 over the thicker insulating layer 18 is bled to the interface between the plastic material 69 and the funnel-shaped surface of the die 55 around the entire periphery of the die and preferably adjacent to the location at which the insulating material 69 enters the die 55.

Reference herein to bleeding a second plastic into the interface between the main body of plastic material being extruded on the moving conductor and a wall forming surface of the die is to be construed as meaning continuously exuding under pressure a comparatively small metered amount of the second plastic material into the interface between the main body of plastic material and the surrounding die in a layer which extends around the entire periphery of the wall forming surface and which is of the desired thickness for the layer formed by the second plastic material, herein designated as the material 79.

In the construction illustrated, a peripheral channel 82 is formed in the outer surface of the die 55 between the leading edge of the die and the wall of the body chamber 51 and this channel 82 is supplied with the plastic material 79 under pressure. The channel 79 is undercut in the manner illustrated to provide a relatively low resistance to the flow of the plastic material 79 around the end of the die 55. By such construction it is possible to maintain a substantially uniform pressure on the material 79 around the die and thus insure bleeding of a circumferentially uniform film of conducting material over a leading edge 84 of the die 55 to the interface between the plastic insulating material 69 and the funnel-shaped well forming surface of the die.

By controlling the pressure of the plastic material 79 within the channel 82, the amount of plastic material 79 which bleeds over the edge 84 of the die to the interface between the wall forming surface of the die and the thicker body of plastic material 69 can be closely controlled. The conducting plastic material 79 is supplied to the channel 82 through the passage 76 by conventional screw conveyor means or equivalent feed means, not shown.

The space (shown exaggerated in the drawing) between the leading edge 84 of the die 55 and the wall of the die body chamber 51 is narrow and controls the thickness of the plastic material 79 bled from the channel 82 to the interface between the insulating material 69 and the wall forming surface of the die 55. In the final product the layer 20 is about 15 to 30 mils in thickness. This layer 20 is tightly and uniformly bonded to the layer 18 through fusion of the two plastic materials 69 and 79 resulting from exposure to the pressure and temperature within the extruding head 50. The insulating layer 18 formed by the material 69 is preferably about 150 to 350 mils in radial thickness. The jacket layer 23 is usually from 50 to 100 mils thick. All layers are preferably polyethylene, with some compounding as is usual. Although the layer 23 does not bond to the layer 20 with the same tightness as connects the layers 18 and 20, this is not objectionable because the layers 20 and 23 are both conductive layers and there is no potential difference between them. The layer 23 can be applied before vulcanizing, if desired.

The layer of plastic material 79 being bled to the outer surface of the thicker layer of plastic material 69 in limited amount spreads uniformly and acts somewhat as a lubricant might be expected to act between the funnel-shaped, wall forming surface of the extrusion die 55 and the outer surface of the plastic insulating material 69 moving through the die.

Because of the way in which the plastic material 79 is applied to the conductor, greater freedom of choice of the compounding of this material is possible. For example, the material 79 may comprise 60 parts of carbon, 50 parts of polyethylene, and 50 parts butyl rubber, all proportions being by weight. Such a conducting compound would, by reason of the inclusion of the large proportion on carbon, have little tensile strength and be incapable of being separately extruded in a thin continuous layer. If an attempt were made to extrude this conducting material separately over a previously formed insulating wall, the extruded conducting layer would be discontinuous and non-uniform, and it would peel and separate readily from the underlying insulation.

Because of the intimate interbonding of the conducting plastic material 79 to the insulating material 69, when applied simultaneously therewith according to the present invention, the mechanical weakness of the shielding layer by itself is acceptable. By reason of the firm bonding of the shielding layer to the insulating layer, the shielding layer is reinforced and supported by the insulating layer and effective continuity and uniformity of the shielding layer are assured.

While subject to modifications to meet special conditions and situations, present experience indicates that a general relation betwen the thickness of the outer layer 20 and the diameter of the conducter 10 can be expressed in percentages. For cables up to ¼-in. diameter, the upper limit of the thickness of the outer layer 20 may be taken as about 2% of the diameter of the conductor 10. For conductor diameters of ¼-in. to ½-in., the maximum thickness of the outer layer 20 may be about 1½% of the diameter; and for conductor diameters above ½-in., the thickness of the outer conducting layer 20 may be about 1% of the diameter of the conductor.

What is claimed is:

1. The method of applying three interbonded layers of plastic material to an electrical conductor core in a continuous operation and in a reduced time and distance, the inner layer being at least semi-conducting and the next layer being an insulating layer, which method comprises continuously advancing the conductor core in the direction of its length and while so advancing extruding onto the core said inner layer of plastic material at a first extruder station, confining said inner layer to a thin layer and cooling said inner layer rapidly to a safe die-contacting temperature by using the conductor core as a heat sink, then applying over the inner layer on the advancing core two additional layers of plastic, said additional layers being applied simultaneously over the inner layer at a second extruder station, by moving the core and inner layer longitudinaly through a die tip, forming a wall of plastic insulating compound around the moving core by forcing plastic compound under pressure through an annular, conically-tapered passageway between the die tip and a die surrounding the said tip, forming a thin, intimately bonded skin of another plastic compound on the said wall as the wall is being formed in the annual conically-tapered passageway before it reaches the moving core by bleeding the second compound under pressure into the interface between the first plastic compound and a wall-forming surface of the passageway before the wall engages the moving core, and extruding the insulating layer with a radial thickness which is of several times greater thickness than the inner layer.

2. The method described in claim 1 characterized by the third layer of plastic material being applied over the electical insulation layer and being of substantially less thickness than the insulation layer.

3. The method described in claim 1 characterized by the layers being vulcanizable material and the conductor core with the superimposed layers thereon being passed continuously from the second extruder station through a vulcanizing chamber in which the layers are vulcanized.

4. The method described in claim 3 characterized by the second and third layers being extruded at high temperatures that cause the layers to bond to one another as they are applied to the inner layer.

5. The method described in claim 1 characterized by the inner layer being extruded to a thickness of from 15 to 20 mils and the insulating layer extruded at the second station being applied directly over the inner layer and having a thickness between 150 and 350 mils, and the other layer applied at the second station being an outer layer of electrical conductive plastic between 15 and 30 mils in thickness.

6. Apparatus for applying three layers of plastic material to a continuously moving conductor core, including a first extruder with means for extruding over the core a thin inner layer and only one layer, of plastic material which is at least semi-conducting and which drops more rapidly in temperature because of heat flow into the conductor as a heat sink, a second extruder that extrudes both of the additional layers over the inner layer at the same time, said second extruder including a die, a chamber and an annular, conically-tapered passageway, mounted in a wall of the extruder, said die having an orifice for discharging the core and its extruded coverings, an extrusion tip within the extruder for guiding the moving core accurately into the die, means for feeding plastic compound under pressure into the die chamber through the annular, conically-tapered passageway and out of the die body orifice with the moving core, for applying an insulating layer of much greater thickness than the inner layer of material, and the second extruder including also means for bleeding a relatively small amount of a second plastic compound under pressure into the interface between the insulating layer and and a wall-forming surface of the extruder within the annular, conically-tapered passageway before the compound reaches the die orifice.

7. The apparatus described in claim 6 characterized by the first extruder having a nozzle of small radial clearance around the core whereby a thin layer of plastic is extruded on the conductor core, the distance between the extruders being correlated with the mass and temperature of the inner layer and the mass and the heat conductivity of the core so that the inner layer cools to a safe die-contacting temperature before the core with the inner layer thereon passes through the second extruder, and the second extruder having means extruding the second and third layers at high temperatures that cause said second and third layers to bond to one another as they are extruded to the first layer.

8. The apparatus described in claim 7 characterized by a vulcanizing chamber beyond the second extruder and through which the coated conductor core travels as it comes from the second extruder.

References Cited

UNITED STATES PATENTS

| | | | |
|---|---|---|---|
| 1,681,566 | 8/1928 | Anderegg | 264—174 |
| 2,739,351 | 3/1956 | Henning | 264—174 X |
| 3,187,071 | 6/1965 | Radziejowski | 264—174 |
| 3,229,012 | 1/1966 | Garner | 264—174 |
| 3,222,721 | 12/1965 | Reynolds | |

ROBERT F. WHITE, *Primary Examiner.*

J. H. SILBAUGH, *Assistant Examiner.*

U.S. Cl. X.R.

18—13